April 13, 1926.
J. L. HERMAN
APPARATUS FOR COATING AND TREATING METALLIC MATERIALS
Original Filed April 26, 1923   6 Sheets-Sheet 1
1,580,890
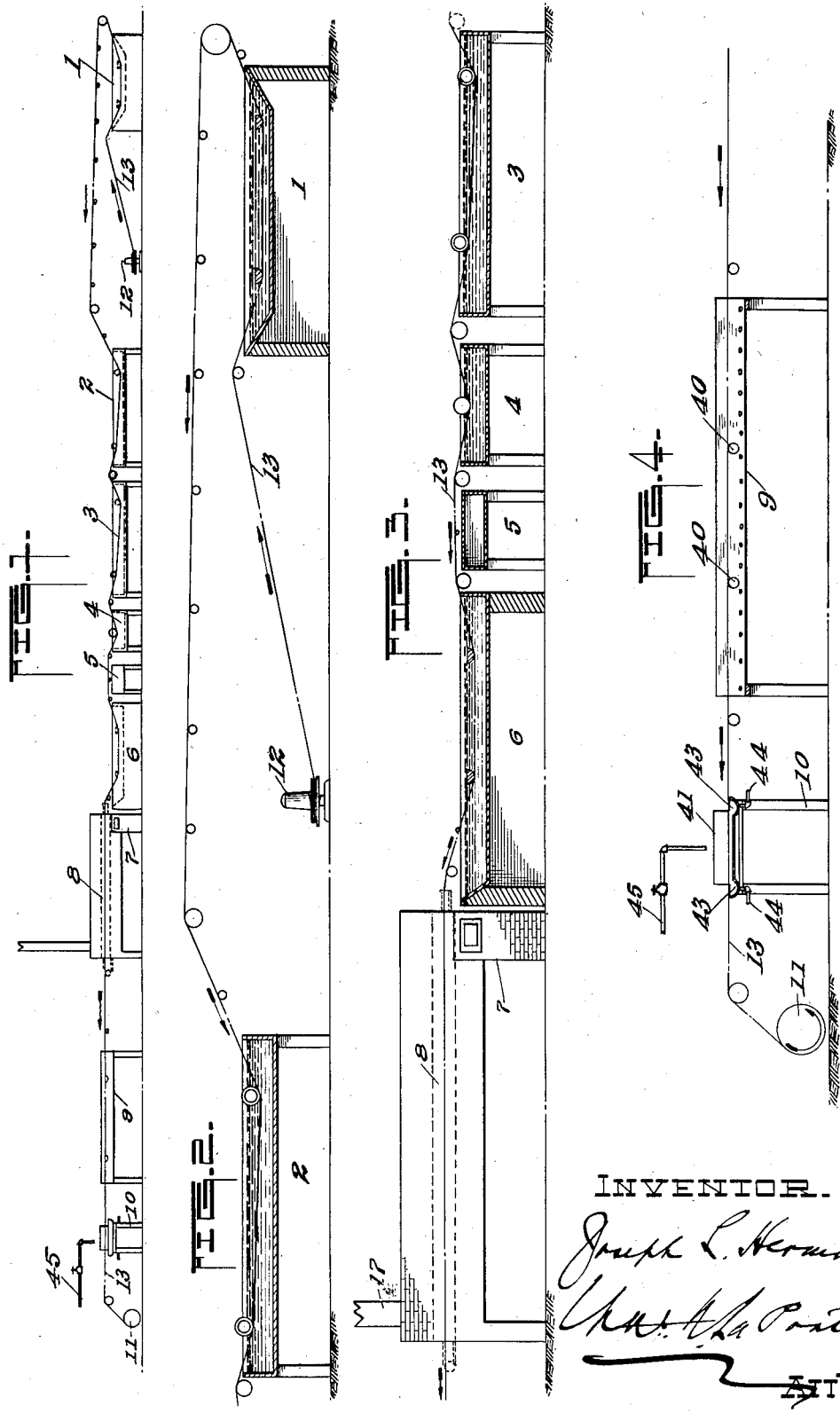

April 13, 1926.
J. L. HERMAN
APPARATUS FOR COATING AND TREATING METALLIC MATERIALS
Original Filed April 26, 1923   6 Sheets-Sheet 2
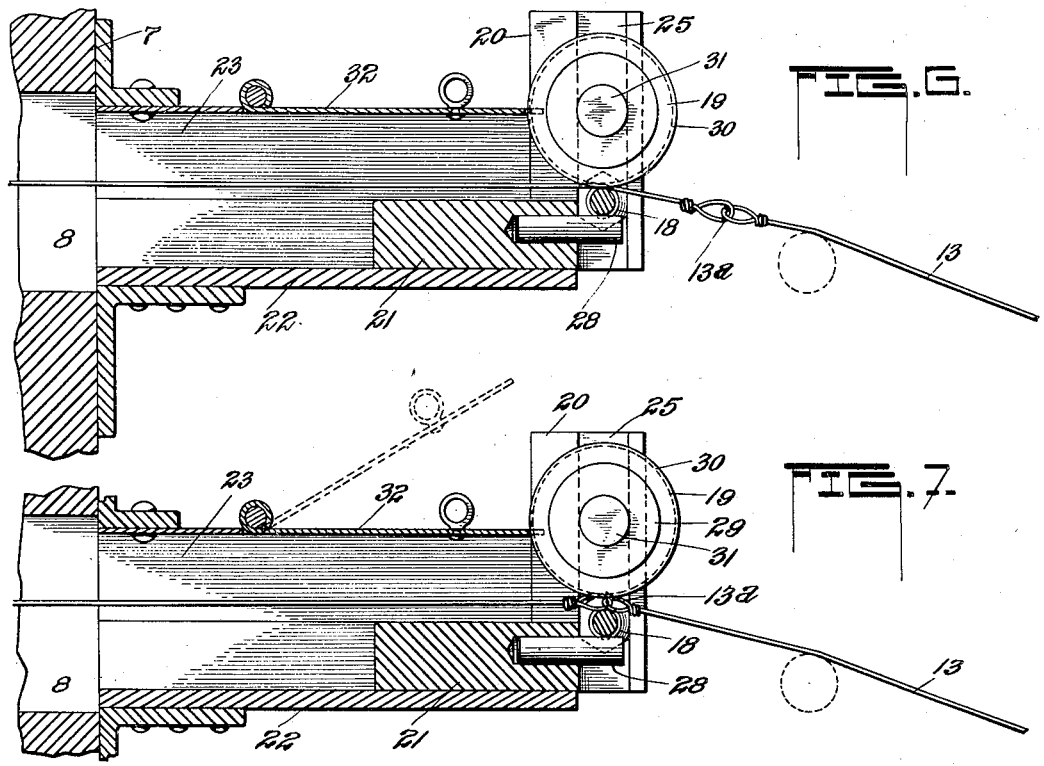
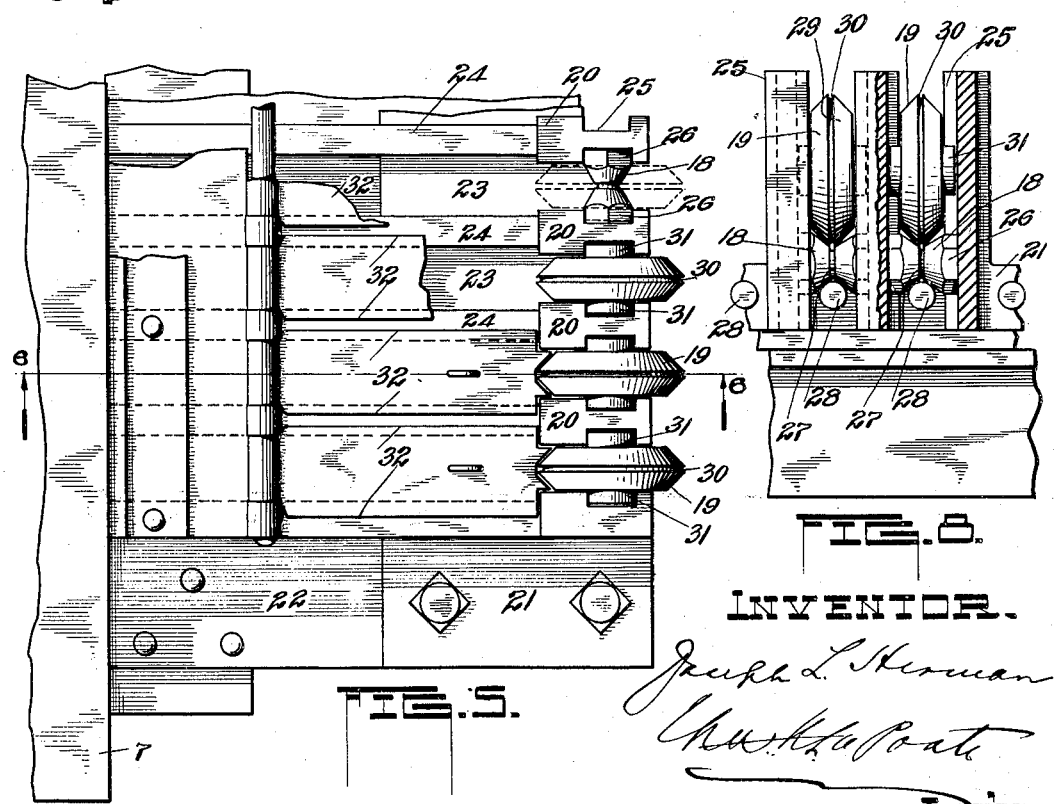

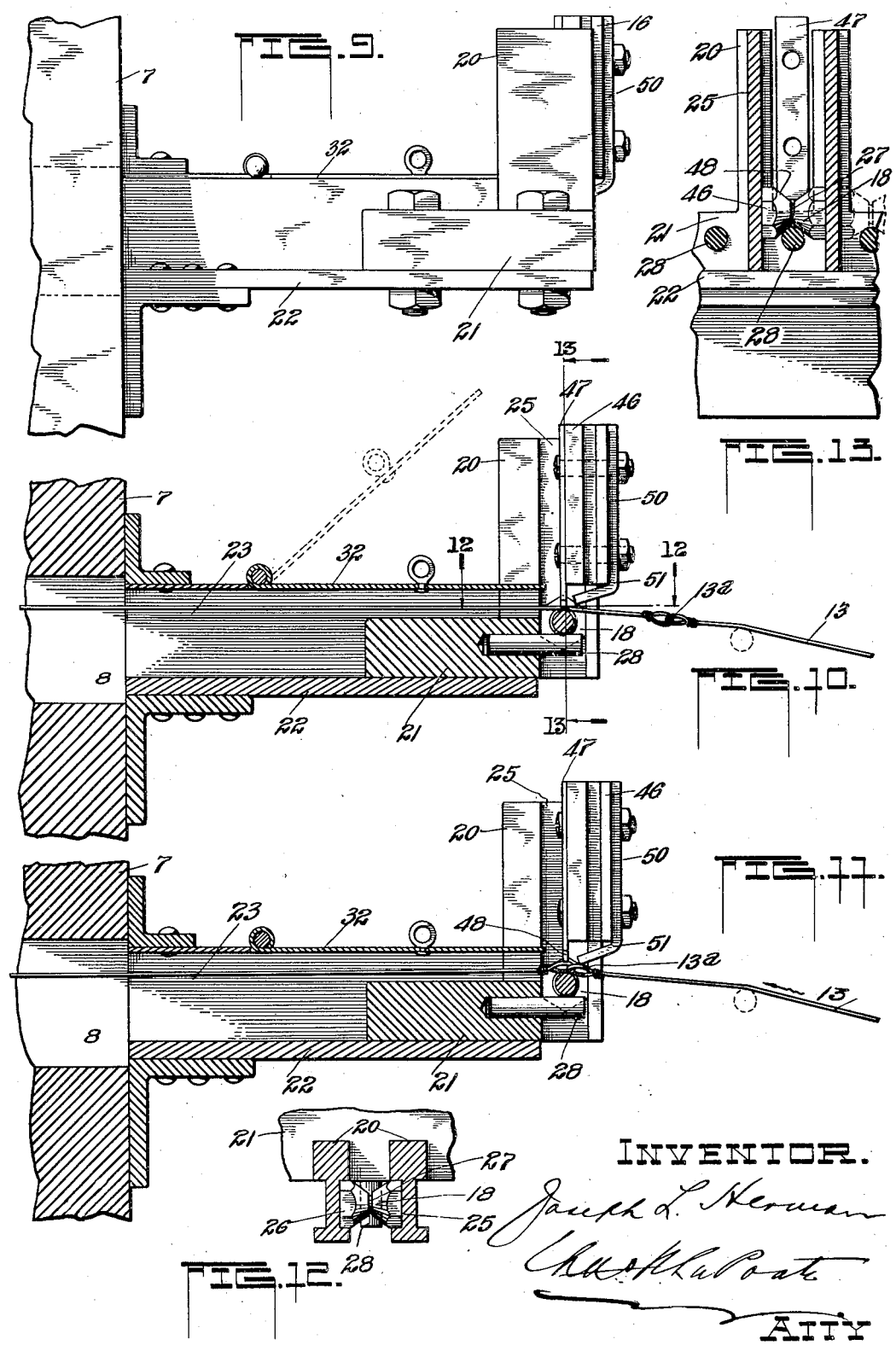

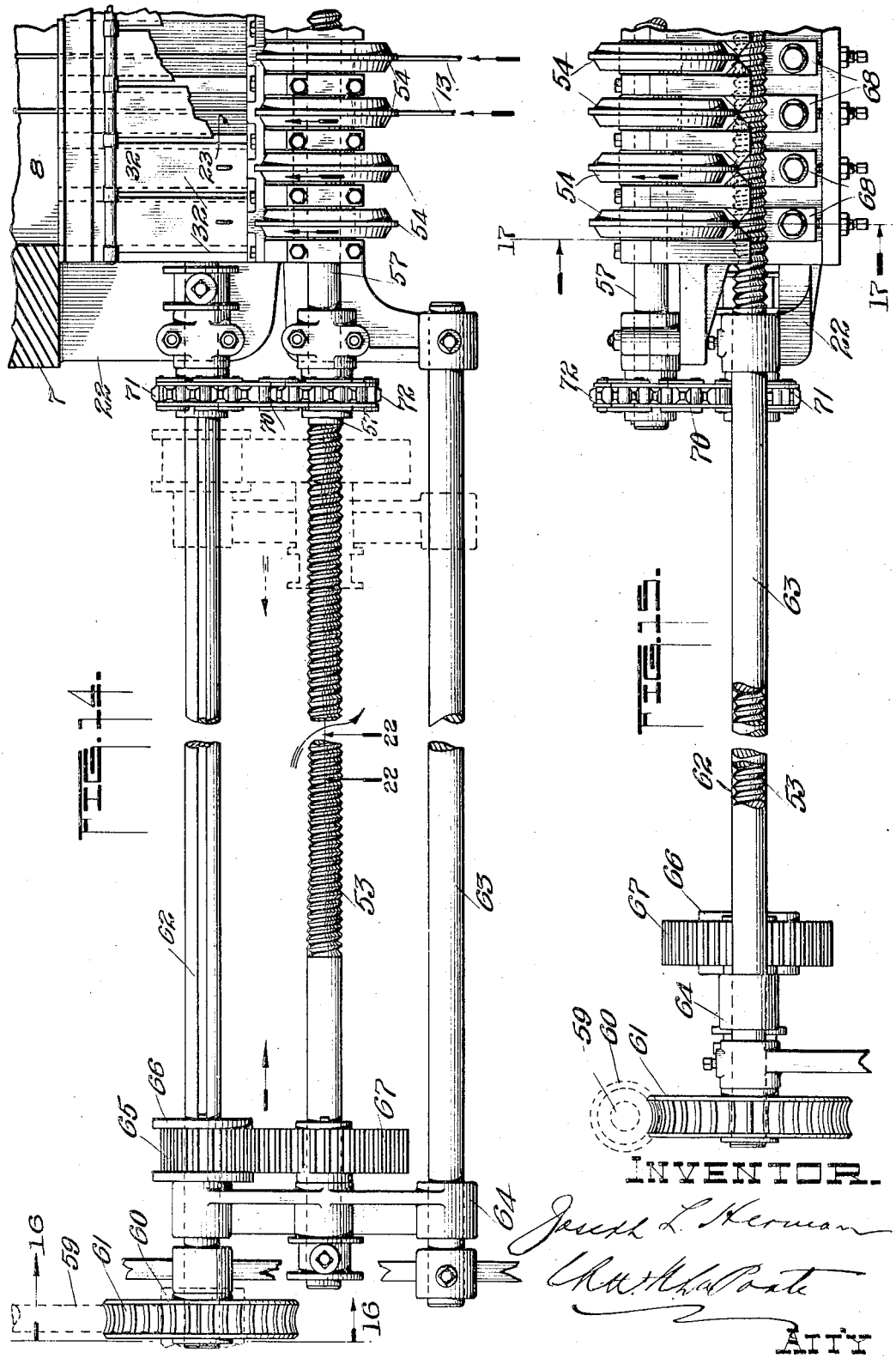

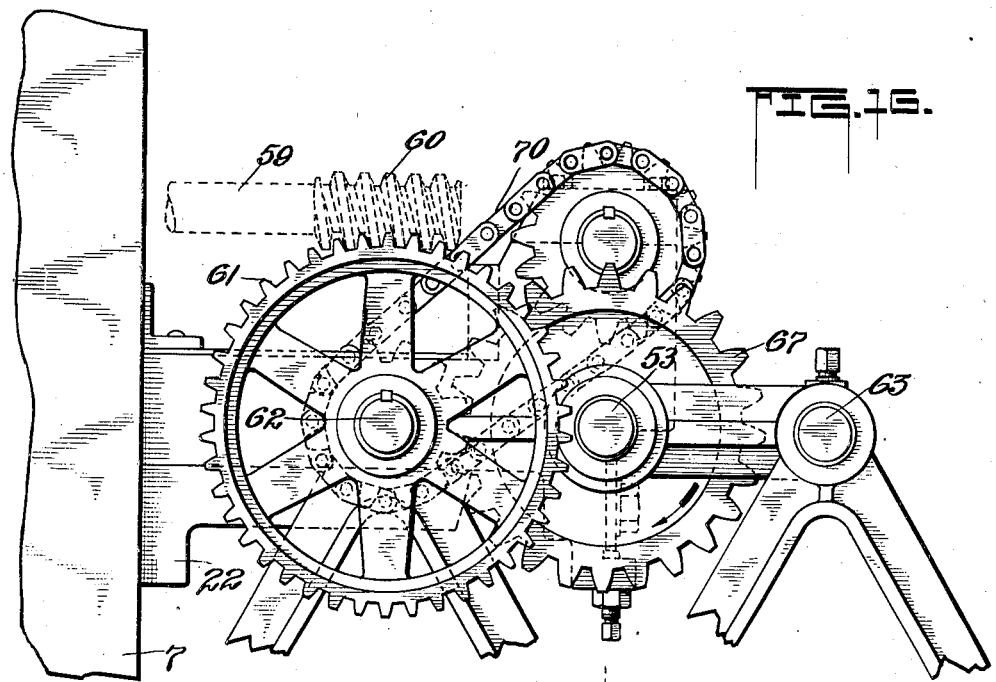
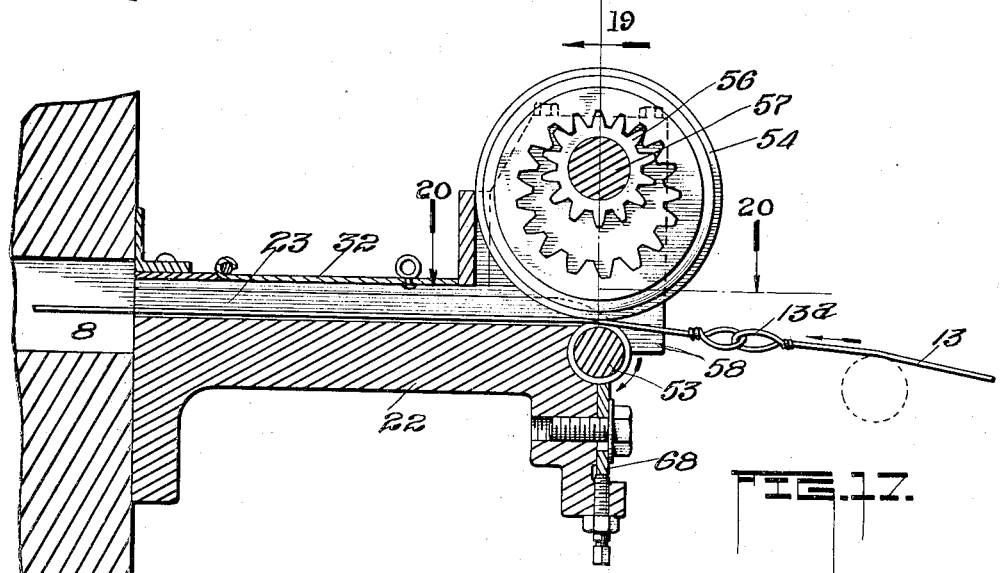

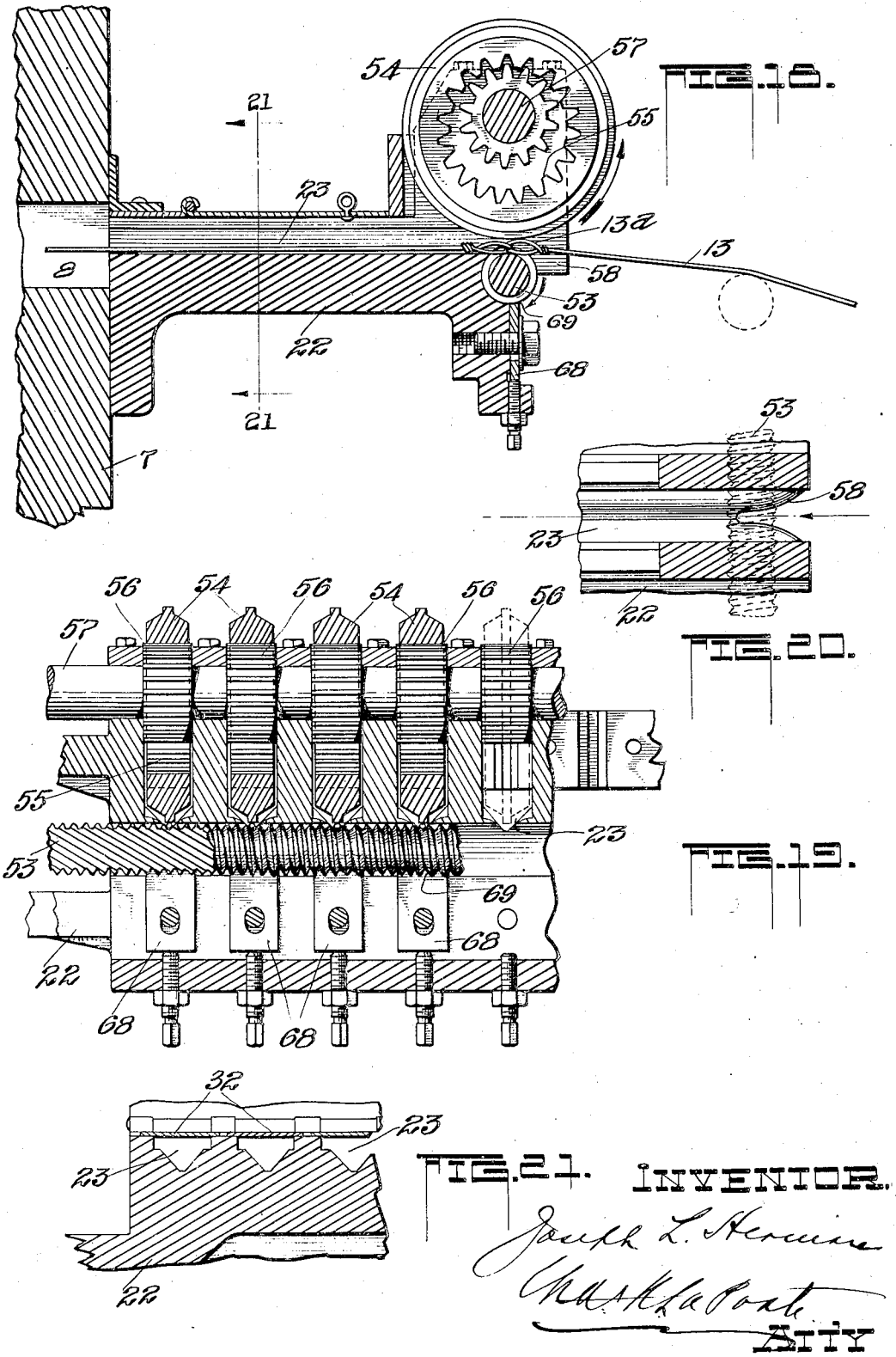

Patented Apr. 13, 1926.

1,580,890

UNITED STATES PATENT OFFICE.

JOSEPH L. HERMAN, OF PEORIA, ILLINOIS, ASSIGNOR TO MIDLAND MANUFACTURING COMPANY, OF PEORIA, ILLINOIS, A CORPORATION OF ILLINOIS.

APPARATUS FOR COATING AND TREATING METALLIC MATERIALS.

Original application filed April 26, 1923, Serial No. 634,773. Divided and this application filed April 2, 1925. Serial No. 20,139.

*To all whom it may concern:*

Be it known that I, JOSEPH L. HERMAN, a citizen of the United States, residing at Peoria, in the county of Peoria and State of Illinois, have invented new and useful Improvements in an Apparatus for Coating and Treating Metallic Materials, of which the following is a specification.

This invention has reference to an apparatus for coating and treating materials having an iron base and particularly the coating and treatment of wire used in the fence industry and for telephone and other purposes.

The invention has for its principal object to provide an apparatus for carrying out the process shown and described in Letters Patent issued to me October 3, 1922, No. 1,430,648 for a process of coating and treating materials having an iron base.

A further object of the invention is to provide in a galvanizing apparatus a heat-treating furnace adapted to receive and heat-treat the coated wires immediately upon their leaving the molten-bath and in the provision of adjustable skimmers located between the molten-bath and entrance to the furnace, said skimmers adapted to remove skimmings, dross or other foreign matter which might adhere to the molten coating metal as it leaves the molten-bath, but without materially reducing the thickness or the amount of the coating metal on the wire, said skimmers being arranged to be automatically operated by contact of joints in the wires and to permit the passage of such joints without the formation of "reachers."

This application is a division of the application filed by me April 26, 1923, bearing Serial No. 634,773.

That the invention may be more fully understood reference is had to the accompanying drawings forming a part of the application illustrating a preferred embodiment invention, in which:

Figure 1 is a diagrammatic elevation showing the arrangement and combination of a complete unit in which my invention is embodied.

Figures 2, 3, and 4 when taken together illustrate in side elevation, partly in section, a complete galvanizing apparatus embodying my invention, and includes in addition to the heat-treating furnace the annealer, acid bath, flux bath, drier, molten-metal bath, take-up frame, water cooling table and blocks; each of the respective elements and associated parts and tensioning devices being on a greatly reduced scale and more or less diagrammatic in character;

Figure 5 is a detail in plan, partly broken away, showing the skimmers and their supporting means and associated parts, located at the front end of the furnace;

Figure 6 is a detailed sectional view, partly in elevation, as the same would appear if taken on the line 6—6 Figure 5 and showing a wire to be heat-treated passing into the furnace and just prior to the actuation of the skimmer by a joint in the wire coming in contact therewith;

Figure 7 is a view similar to Figure 6, except that it shows the joint in the wire in the act of operating a skimmer to permit the passage of the joint into the furnace;

Figure 8 is a detailed front elevation, partly in section, looking in at the skimmer structure shown at the right hand side of Figure 5;

Figure 9 is a detail side elevation showing one modification of the skimmer structure;

Figure 10 is a detail longitudinal sectional view, partly in elevation, showing the modified skimmer construction with a joint in the wire just before it engages with the skimmer;

Figure 11 is a view similar to to Figure 10, except that the joint has entered into engagement with the skimmer and actuated the latter to permit the passage of the joint into the furnace;

Figure 12 is a detail in plan as the same would appear if taken on the line 12—12 Figure 10;

Figure 13 is a detail in elevation, partly in section, as the same would appear on the line 13—13 of Figure 10;

Figure 14 is a plan view, partly broken away, showing a further modification of the skimmer mechanism;

Figure 15 is a front elevation, partly broken away, of the modified structure shown in Figure 14;

Figure 16 is an elevation as the same would appear looking into the left hand end of Figure 14 on the line 16—16 of said Figure 14;

Figure 17 is a detailed cross sectional view of the modified structure shown in Figure 14 and as the same would appear if taken on the line 17—17 Figure 15 and just prior to engagement of the skimmer by a joint in the wire;

Figure 18 is a view somewhat similar to Figure 17, except that it shows the joint in the wire engaging a skimmer to permit passage of the joint into the heat-treating furnace;

Figure 19 is a detail cross-section as the same would appear if taken on the line 19—19 of Figure 17;

Figure 20 is a sectional detail, in plan, as the same would appear if taken on the line 20—20 Figure 17;

Figure 21 is a detail cross sectional view, as the same would appear if taken on the line 21—21 Figure 18, and Figure 22 is a detail sectional view of a thread shaft, as the same would appear on the line 22—22 Figure 14.

Like characters of reference, denote corresponding parts throughout the figures.

The apparatus for carrying out the improved process of coating and treating materials having an iron base, and preferably galvanized wire, such as is shown and described in my Patent No. 1,430,648 includes the annealer 1, preferably of the lead-pan type, although it may be of any other suitable structure; the acid-tanks 2 and 3 adapted to contain a suitable cleaning acid. I have elected to show two acid tanks, particularly in view of it being a continuous process; whereby when the acid in one tank becomes too weak or dirty that in the other tank may be used. While they may be used simultaneously, it is preferable to use them alternately. The apparatus further includes a flux bath 4, adapted to contain a suitable fluxing material such as zinc chloride for the purposes which such fluxes are ordinarily used in coating processes of this character; a drier 5 to insure the material entering into the molten-bath in a comparatively dry state, and the molten-metal coating bath 6 which, in this instance, would contain spelter. Adjoining the molten-metal bath, for the purpose of heat-treating the coated material as it leaves said bath, is a heat-treating furnace 7 provided with one or more longitudinally disposed heat-treating chambers 8 through which the coated material is drawn and heat-treated. Adjoining the heat-treating furnace 7 and adapted to receive the heat-treated coating material, as it leaves the furnace, is a take-up frame 9. This take-up frame functions to keep the material under tension as it passes through the furnace and prevents whipping of such material, particularly wires, while passing through the furnace. Adjoining the take-up frame 9 is a water cooling table 10 over which the heat-treated material passes before being coiled on blocks 11, of which there are preferably one for each of the wires coated and heat-treated.

As shown, the apparatus is intended for galvanizing wire by a continuous process and it will be observed that the wires after they leave the reels 12 are drawn through the several units of the apparatus by the winding blocks 11 in as near a horizontal line as it is possible to carry the wires. The guiding and tensioning rollers over which the wires are carried tend to hold the wires taut and prevent vibration and whipping. It is not thought necessary to specifically refer to the guiding and tensioning rollers or other devices which are shown at suitable points throughout the apparatus, or the sinkers, shoes or tile which are employed in connection with certain of the units to hold the wires submerged in the liquids or molten metal contained therein. In each of the respective Figures 1, 2, 3 and 4 a wire 13 is shown, being the same wire throughout for the purpose of illustrating the use of the apparatus in the preparation of the wire, the coating thereof and the heat-treatment subsequent to the coating step. It is understood that in an apparatus of this character the structure would provide for the preparation, coating and heat-treating of a plurality of wires.

In my Patent No. 1,430,648 I brought out the fact that a process such as therein shown and described obviated the necessity of using wipers or other smoothing mediums for the coated wires leaving the molten-bath, and which heretofore were considered indispensable by all wire galvanizers. The reason for this is due to the action of the heat-treating furnace which not only heat-treats per se, but also evens up the coating as though it had been passed between wipers. It is further stated in said patent that another advantage in the elimination of the wipers is that a heavier coating is permitted to remain on the wire, which in ordinary practice would be removed by the wipers as the wires pass therebetween. The fact that the coated wire is not wiped as it leaves the molten-bath allows a heavier coating to remain upon the wire. Such wire when subjected to the action of the heat-treatment will not only cause the heavy coating to distribute itself around the wire but eliminates brittleness of the coating. Like in the process described in said patent, the present apparatus obviates the use of wipers; however, I provide skimmers which are located between the molten-bath and the entrance to the heating chambers of the hot-treated furnace. These skimmers neither wipe nor smooth the wires, as would wipers such as are ordinarily used. In the art of galvanizing several different types of wipers are employed, designated as pressure-wipers, of the screw or lever types, and charcoal wipers such as are used in connection with the coating of telephone and telegraph wires. The skimmers which I employ have for their object the removal of skimmings, dross and any foreign matter which may collect on the coatings as the coated wires emerge from the coating bath. Of course, I appreciate the fact that the surface of the molten coating metal at the points where the wires emerge therefrom may be kept free of dross, skimmings and foreign matter in a well known manner by the use of salammoniac, but this practice is recognized as being too costly for wire galvanizing purposes, and therefore to insure that the coated wires shall enter the heat-treating furnace free of all dross, skimmings and foreign matter, I have provided mechanical skimmers which accomplish the purpose sought but without in any way removing the molten-metal adhering to the wires. Furthermore, as will be explained, the skimmers which I employ, not only prevent "reachers" forming on the wires, but such skimmers are adapted to be actuated by the joints in the wires to permit their passage of the latter into the furnace.

The preferred skimmer structure is shown in Figures 5 to 8 both inclusive, dotted lines indicating in a diagrammatic way the application of the skimmer structure to the front end of the furnace 7, see Figure 3. As will be understood, there is a skimmer for each wire 13 leaving the coating bath and entering the furnace, and each skimmer preferably includes two members 18 and 19 in superimposed relation. Said members are removable, adjustable and interchangeable in upstanding guides 20 provided on a support 21 connected with a housing 22 supported on the front end wall of the furnace and extending transversally thereof and positioned in front of the entrance end of the heat-treating chambers 8 whereby the wires 13 may be guided into said heating chambers. The housing 22 is separated into a plurality of spaced chambers 23 separated from each other by the longitudinal partitions 24 at the forward ends of which are disposed the guides 20 formed with vertically disposed grooves 25 in their opposite faces for the insertion and removal of the skimmer members and in which the members 19 hold their position by weight of gravity, or in other words, merely float in the guides and are adapted to be turned by contact of the joints 13ª in the wires 13; again dropping into position as the joints 13ª pass beneath the members 19. The members 18 of the skimmers have opposite polygonal ends 26 to adapt them to have a sliding relation in the grooves 25 of the guides 20 to provide for the turning of the members 18 after they have been removed from the guides and reinserted to present new surfaces to the wires 13 passing over the same into the furnace. As shown in Figure 8 the members 18 of the skimmers are provided with oppositely converging surfaces terminating in a concentric groove or slot 27 and said members when in position rest upon stems 28 secured in the support 21, space being left there for the drip of skimmings, dross or foreign matter removed from the coating on the wires 13 by the skimmers, which preferably drains into the molten-metal-bath 6, this being made possible by the location of the skimmers above the molten-metal-bath 6, as shown in dotted lines in Figure 3. The members 19 of the skimmers comprise disks 29 having the oppositely disposed tapered peripheries terminating in a centrally disposed concentric groove or slot 30 corresponding to the groove 27 in the lower members 18. The width and depth of the grooves or slots 27 and 30 of the respective skimmer members will be determined by the gauge or the size of the wires that are to be passed therebetween. Each of the disks 29 comprising the member 19, are provided with trunnions 31 which have bearings in the grooves 25 of the guides 20 and will allow for the raising and turning of said members 19 through contact of the joints 13ª in the wires 13 therewith. In active position the skimmer members 19 rest upon the skimmer members 18 their sloping or tapered surfaces being of such a character that the slots or grooves in the said members form an opening between the same for the passage of the coated wires 13 there-between, said slots or grooves together providing an opening of sufficient size to permit the bodies of the coated wires to pass there-between without any wiping or smoothing action of the skimmer members on the coating itself, but, acting to skim the coatings of any dross, skimmings or foreign matter which might collect on the coatings as the wires leave the molten-metal-bath. The operation of passing the bodies of the coated wires 13 between the skimmer members 18 and 19, when in their normal position is best seen in Figure 6. In said figure and in Figure 7 two lengths of wire 13 are shown joined in the customary manner by joints 13ª. When this joint comes into contact with the skimmer it will both raise and turn the floating member 19 so as to permit the joint to pass the skimmers and to enter the heat-treating furnace. It will be observed that the skimmers act upon the body of the coated wires 13 up to the point of the contact of the twisted portion of one joint 13ª before the floating member 19 is acted upon the latter dropping back into position immediately upon the other coil of the joint passing such skimmer and thereby obviate the formation of "reachers." This eliminates the reacher losses formed in other well known methods of galvanizing and particularly where wipers are used. It will be observed looking at the housing 22, both in front and sectional elevations, that there is very little, if any, space left around the skimmers through which air might enter and thus reduce the temperature of the heat-treating chambers of the furnace. Each of the chambers 23 in the housing 22 is provided with a hinged lid or cover 32 to permit access to be had into such chambers and into the entrance ways of the heating chambers of the furnace.

Referring to the modified forms of the skimmer structure, reference is first had to the modification shown in Figures 9 to 13 both inclusive. The only modification shown in these figures of the structure illustrated in Figures 5 to 8 both inclusive is the floating member to take the place of the vertically movable and rotatable member 19. In place of the member 19 there could be employed a vertically movable block 46 provided with vertically disposed grooves or slots in its opposite face whereby the block may have a slidable relation with flanges on the guide 20. Secured to the rear face of the block 46 is a plate 47, see Figure 13 which has the oppositely tapered or wedge-shaped lower end 48 converging into a groove or slot 49 to co-act with the groove or slot 27 in the lower skimmer member 18, the plate 47 resting upon the lower skimmer member 18 and functioning somewhat in the same manner as the skimmer member 19. Connected with the front face of the block 46 is a plate 50 which is formed at its lower end with the angularly inturned portion 51 presenting a sloping surface having cam like action when a joint 13ª on a wire 13 passes there-beneath. The joint coming into contact with the angular end 51 of the plate 50 will raise the block in manner similar to the raising of the member 19, said block immediately dropping back into operative position upon the passage of the joint beneath the angular end 51. The plate 47 functions together with the lower member 18 to skim the dross, skimmings or other foreign matter which may collect on the coatings of the wires as they leave the metal coating bath; whereas the angular portion 51 of the plate 50 is the means engaged by a joint in the wire for the raising of the block 46 so as to permit the joint to pass into the furnace. It being understood of course that the plates 47 and 50 ride with the block 46 and are removable therewith, being preferably secured thereto by the same bolts.

The blocks 46 with the plates are removable and interchangeable on the support 21 for the same reason as the members 19, and the lower skimmer members 18 in the modified structure may have their positions changed in like manner as in Figures 5 to 8, both inclusive. The period of time that the skimmer members may be used without having their surfaces changed which are presented to the coated wires, or replaced, is indefinite, but the slots or grooves in the members presented to the coated wires will occasionally clog up and thereby interfere with the opening between the skimmer members and the passage of the coated wires, necessitating that these surfaces be occasionally changed. In the form shown in Figures 5 to 8 both inclusive, and 9 to 13 both inclusive it is necessary for the manual manipulation of the lower members 18 to change their positions to present new surfaces to the coated wires. In the modified form which I am now about to describe this change is made mechanically and automatically.

Referring now to Figures 14 to 22, both inclusive which shows a further modified form of the skimmer structure it is to be pointed out that such changes as will be described make it possible to reduce the depth of the chambers 23 in the housing 22, as is best seen in Figures 17 and 18.

In place of a plurality of the lower skimmer members 18, previously described, I provide a threaded shaft 53 the pitch between the adjacent threads or convolutions, and the character of such threads being determined by the gauge of the wires coated and heat-treated. The threads or convolutions of the shaft 53 function exactly like the grooves or slots in the lower skimmer members 18 previously described and co-acting with said threaded shaft 53 are a plurality of spaced ring-like members 54 which take the place of the disks 19. The ring-like members are preferably internally threaded as at 55 and meshing with the threads of each member is a small pinion secured on a shaft 57 preferably arranged eccentric to the axis of the ring-like members, bearings for the shaft being connected to the housing 22 and disposed between the ring-like members as shown. The threaded shaft 53 and the shaft 57 are in spaced parallel relation one above the other and the arrangement is such that the ring-like members 54 are gradually turned to change the surface presented to the coated wire passing between the threaded shaft and such ring-like members The ring-like members float on the pinions 56 and are adapted to be raised, somewhat as shown in Figure 18 when the joints in the wires come into contact therewith, which is the action in the preferred form of the skimmer, as shown in Figures 5 to 8 both inclusive. The entrance to the housing 22 for the respective wires entering there-into have beveled surfaces 58, as shown in Figure 20 for the accurate guiding of the wires there-into and for the guides of the joints 13ª of the wires 13.

The mechanism for operating the shafts 53 and 57 respectively, includes a driving shaft 59 shown in dotted lines in Figures 14 and 16 which may receive its power from any suitable source and to which is connected a worm 60 meshing with and driving a worm wheel 61 secured to a shaft 62. This latter shaft and a rail 63 arranged in parallel spaced relation thereto constitute guides for a frame 64 adapted to have a slidable relation therewith, and located intermediate the shaft 62 and the rail 63 is the threaded shaft 53 which has connection with the frame 64 and movable therewith. Having a spline and groove connection with the shaft 62, is a small gear wheel 65 disposed within a guide 66 and said gear wheel 65 meshes with a much larger gear wheel 67 secured on the threaded shaft 53. To insure the feeding of the shaft 53 as it is slowly rotated through the gearing just described, I provide the plurality of plate members 68 which are adjustably connected to the housing 22, as best seen in Figures 17 and 19, said plates having toothed upper ends 69 which mesh with the threads or convolutions on the threaded shaft 53 and also act as guides to correctly position the threads or convolutions on the shaft in relation to the ring-like members 54 and properly position and hold such threads or convolutions in relation to the coated wires which are drawn through the skimmers and into the heat-treating furnace. The shaft 57 is rotated preferably from the shaft 62 by means of a chain 70 which receives its power from a sprocket wheel 71 carried on the shaft 62 and which operated a sprocket wheel 72 carried on the shaft 57.

The modified structure of the skimmer as last described, is for the purpose of illustrating that instead of manually changing the respective members, this may be done by mechanical means continuously and automatically; it being understood, of course, that the speed at which the shafts 53 and 57 are rotated is extremely slow, and it is preferable and a more satisfactory practice to operate the shaft 53 much slower than the shaft 57.

I have shown the skimmers located so that the drip will drain back into the molten-metal-bath. I do not desire by this showing to exactly locate the skimmers as it may be found desirable to drip back into a separate receptacle located between the baths and the heat-treating furnace, and thereby provide for bringing the operator into much closer contact with his work.

What I claim is:—

1. In a wire galvanizing apparatus, in combination with a tank containing a molten-metal bath, of skimmers between which the coated wires pass as they leave the bath, said skimmers adapted to remove skimmings, dross or other foreign matter which might adhere to the coating as the wires leave the bath without materially reducing the thickness of the coating, each skimmer including a member adapted to be raised by contact of joints in the wires as they pass between the skimmers.

2. In a wire galvanizing apparatus, in combination with a tank containing a molten-metal bath, of skimmers between which the coated wires pass as they leave the bath, said skimmers adapted to remove skimmings, dross or other foreign matter which might adhere to the coating as the wires leave the bath without materially reducing the thickness of the coating, each skimmer including a member adapted to be raised by contact of joints in the wires as they pass between the skimmers, and to again assume their normal positions by weight of gravity after the passage of the joints in the wires.

3. In a wire galvanizing apparatus, in combination with a tank containing a molten-metal bath, of skimmers between which the coated wires pass as they leave the bath, said skimmers adapted to remove skimmings, dross or other foreign matter which might adhere to the coating as the wires leave the bath without materially reducing the thickness of the coating, each skimmer comprising a pair of adjustable members, one of which is adapted to be raised by contact of joints in the wires as they pass between the skimmers.

4. In a wire galvanizing apparatus, in combination with a tank containing a molten-metal bath, of skimmers between which the coated wires pass as they leave the bath, said skimmers adapted to remove skimmings, dross or other foreign matter which might adhere to the coating as the wires leave the bath without materially reducing the thickness of the coating, each skimmer comprising a pair of adjustable members, one of which is adapted to be raised by contact of joints in the wires as they pass between the skimmers, and to again assume their normal positions by weight of gravity after the passage of the joints in the wires.

5. In a wire galvanizing apparatus, in combination with a tank containing a molten-metal bath, of skimmers between which the coated wires pass as they leave the bath, each skimmer including two members, means for slowly rotating the skimmer members in comparison with the speed of the wires passing there-between, one each of said skimmer members adapted to be raised by contact of joints in the wires as they pass there-between and to again assume normal position after the passage of said joints.

6. In a wire galvanizing apparatus, in combination with a tank containing a metal coating bath, of a heat-treating furnace next adjacent the bath for heat-treating the coated wires as they leave the bath, and skimmers between the bath and the furnace between which the coated wires pass, each skimmer including superimposed adjustable members, the upper one of which is adapted to be raised by contact of joints in the wires to permit the passage of the joints from the bath into the furnace, said skimmers adapted to remove skimmings, dross or other foreign matter which might adhere to the coating as the wires leave the bath and without materially reducing the thickness of the coating.

7. In a wire galvanizing apparatus, in combination with a tank containing a molten-metal bath, of skimmers between which the coated wires pass as they leave the bath, each skimmer including two members, means for slowly rotating one member in relation to the other, and one of said members adapted to be raised by contact of joints in the wires as they pass between said skimmer members.

JOSEPH L. HERMAN.